US008107702B2

(12) United States Patent
Agliozzo

(10) Patent No.: US 8,107,702 B2
(45) Date of Patent: Jan. 31, 2012

(54) PROCESS AND SYSTEM FOR AUTOMATICALLY RECOGNISING PRENEOPLASTIC ABNORMALITIES IN ANATOMICAL STRUCTURES, AND CORRESPONDING COMPUTER PROGRAM

(75) Inventor: Silvano Agliozzo, Turin (IT)

(73) Assignee: IM3D S.p.A., Turin (IT)

( * ) Notice: Subject to any disclaimer, the term of this patent is extended or adjusted under 35 U.S.C. 154(b) by 795 days.

(21) Appl. No.: 12/294,187

(22) PCT Filed: Mar. 11, 2007

(86) PCT No.: PCT/IB2007/051012
§ 371 (c)(1),
(2), (4) Date: Sep. 23, 2008

(87) PCT Pub. No.: WO2007/110820
PCT Pub. Date: Oct. 4, 2007

(65) Prior Publication Data
US 2009/0252393 A1 Oct. 8, 2009

(30) Foreign Application Priority Data
Mar. 24, 2006 (IT) .............................. TO2006A0223

(51) Int. Cl.
*G06K 9/00* (2006.01)
*G06K 9/62* (2006.01)

(52) U.S. Cl. ....................................... 382/128; 382/225

(58) Field of Classification Search .................. 382/128, 382/131–133, 164, 190, 194, 199, 203, 224, 382/225, 256, 257; 250/455, 208.1; 378/4, 378/8, 21–27; 600/407, 425; 345/419, 424
See application file for complete search history.

(56) References Cited

U.S. PATENT DOCUMENTS

| 7,043,064 B2 * | 5/2006 | Paik et al. ..................... 382/128 |
| 7,236,620 B1 * | 6/2007 | Gurcan ......................... 382/128 |
| 7,260,250 B2 * | 8/2007 | Summers et al. ............. 382/128 |
| 7,558,611 B2 * | 7/2009 | Arnold et al. ................. 600/407 |
| 2003/0223627 A1 * | 12/2003 | Yoshida et al. ............... 382/128 |
| 2004/0258285 A1 * | 12/2004 | Hansen et al. ................ 382/128 |
| 2005/0152588 A1 * | 7/2005 | Yoshida et al. ............... 382/128 |
| 2006/0018549 A1 | 1/2006 | Liang et al. |

OTHER PUBLICATIONS

Martin Ester, et al., "A Density-Based Algorithm for Discovering Clusters in Large Spatial Databases with Noise," Proceedings of 2nd International Conference on Knowledge Discovery and Data Mining (KDD-96), Jan. 1, 1996, p. 226-231 (XP-002355949).

* cited by examiner

*Primary Examiner* — Que T Le
*Assistant Examiner* — Pascal M Bui Pho
(74) *Attorney, Agent, or Firm* — Sughrue Mion, PLLC

(57) ABSTRACT

A process for the automatic recognition of abnormalities in anatomical structures is described together with a processing system and a computer program for implementing the aforesaid process, comprising the operations of:

acquiring (10) a plurality of two-dimensional images of at least one portion of a patient's body capable of forming a three-dimensional representation of at least one anatomical structure under observation, segmenting (20) a region of interest in the said three-dimensional representation which potentially contains anomalies, selecting (30, 40) volume image elements (voxels) from the segmented region which are likely to form a part of abnormalities in the anatomical structure represented, on the basis of predetermined morphological parameters, agglomerating (60) the said voxels into analysis units on the basis of the distribution of the spatial density of the voxels selected, and classifying (70) the said analysis units as elements suspected of being parts of abnormalities or as elements which are not part of abnormalities.

18 Claims, 3 Drawing Sheets

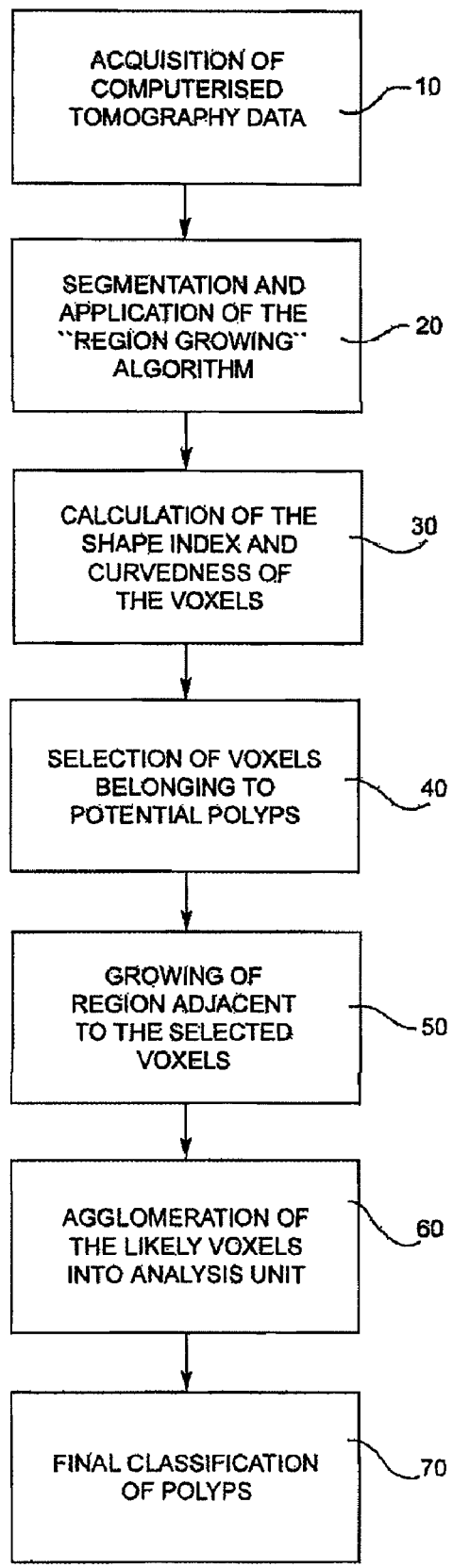

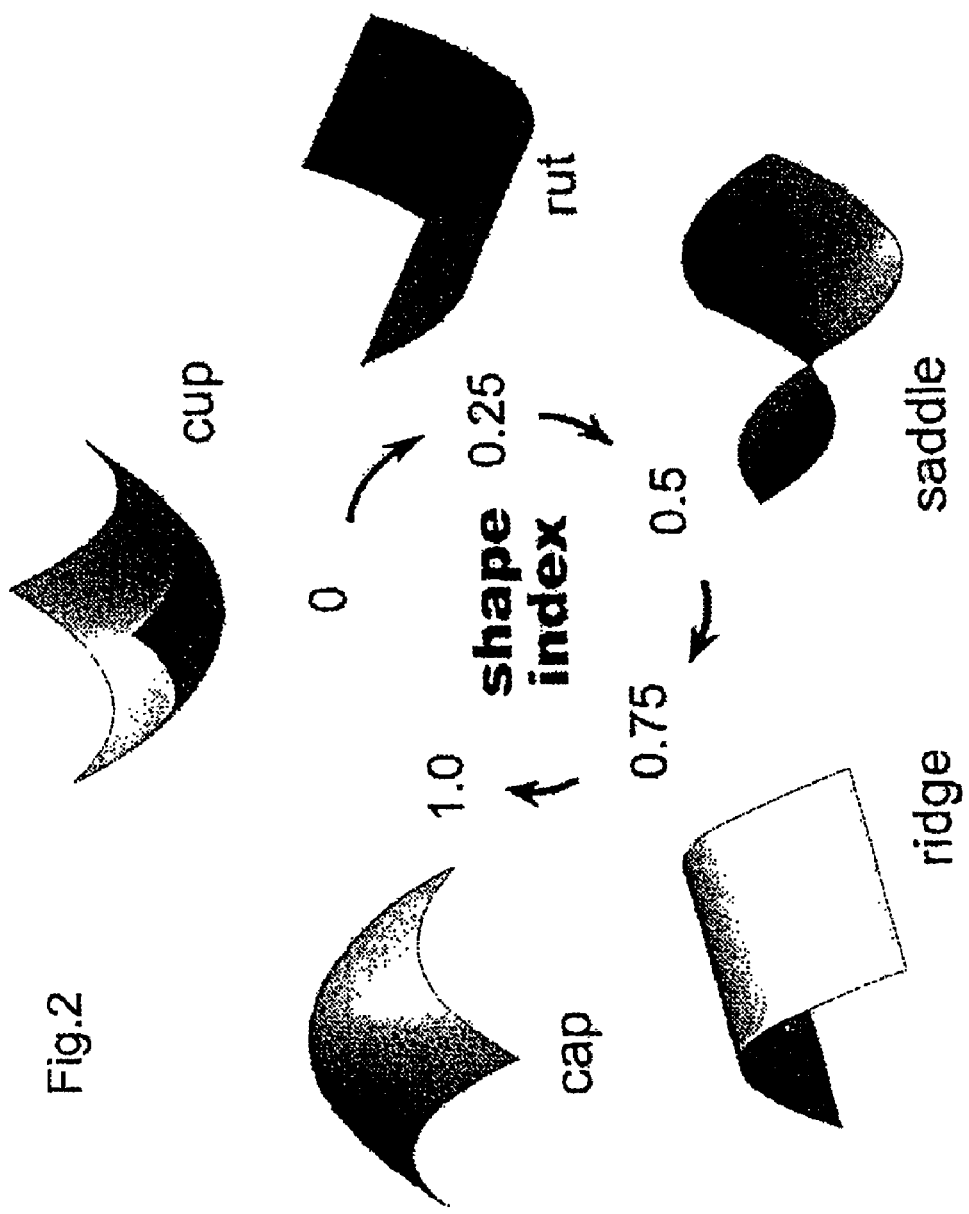

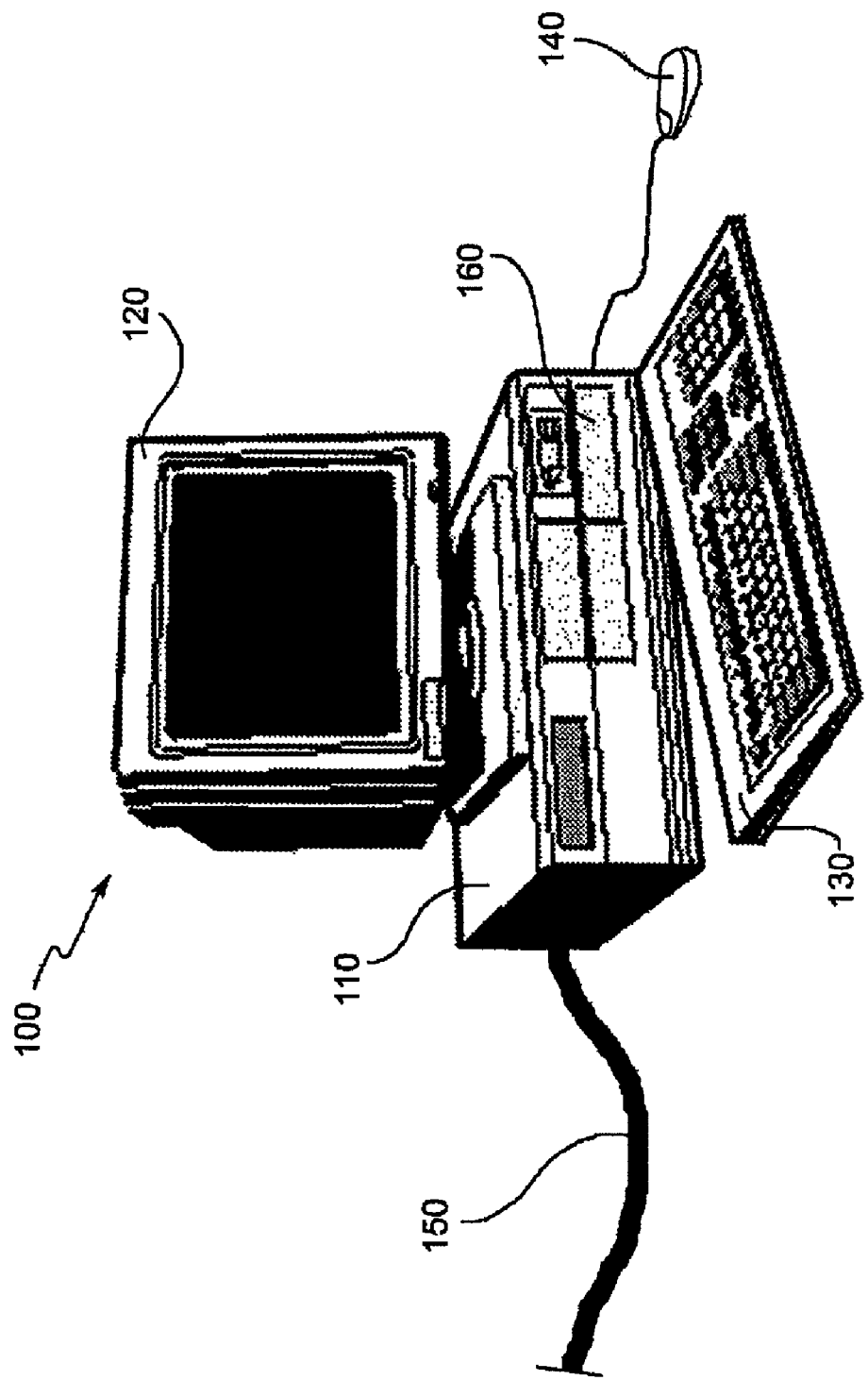

PROCESS AND SYSTEM FOR AUTOMATICALLY RECOGNISING PRENEOPLASTIC ABNORMALITIES IN ANATOMICAL STRUCTURES, AND CORRESPONDING COMPUTER PROGRAM

This invention relates to the preparation of images and specifically the recognition of objects and/or structures in images, and in particular formations representative of abnormalities in anatomical structures.

More specifically, it relates to a process for the automatic recognition of abnormalities in anatomical structures and in particular preneoplastic lesions of the colon-rectum according to the preamble of claim 1, as well as a processing system and a computer program for implementing the aforesaid process.

Processes, systems and computer programs for identifying three-dimensional lesions in organs and tissues of the human body through the analysis of digital representations of an anatomical structure and subsequent classification of the abnormalities found are in general known.

Colonorectal carcinoma is today the second cause of neoplastic death in the world. Recently, diagnostic means which are less invasive than conventional medical examinations by colonoscopy, which enable the entire colon to be explored without the need to introduce sensors which might inconvenience the patient and, in the limit, damage tissues (perforation, haemorrhage), giving rise to severe complications, have made a name for themselves.

These diagnostic means make use of radiodiagnostic techniques to carry out a so-called "virtual endoscopy". Through this technique it is possible to obtain a view of the patient's organs, similar to that in conventional endoscopic procedures, through three-dimensional processing of a series of images obtained by Computerised Tomography (CT).

Systems which carry out virtual colonoscopy (VC) are in use. This type of virtual navigation within the lumen of the colon nevertheless makes it necessary to carry out very long examinations on patients because of the time required to process images and for the doctor to read them, as it is necessary to travel along the entire length of the colon (approximately 1.5 meters).

Automatic systems are known which carry out recognition and extraction of the colon image from the set of image data obtained by computerised tomography, making use of the differences in X-ray absorption intensity by the air present in the lumen of the colon and the tissue part of the colon itself.

In particular, an operation of segmentation of the internal surface of the colon is performed. Segmentation is an operation designed to extract parts of images constituent homogeneous regions on the basis of a predetermined criterion of belonging of image elements to a region, through which the image of the internal surface of the colon is extracted from the overall three-dimensional image obtained by tomography, recognising and eliminating the volumes of air outside the patient, the volumes of air within the lungs, regions of fat and muscle and finally the volume of air within the colon itself, according to the differences in the intensity of X-ray radiation absorption between the said regions.

Once the internal surface of the colon has been obtained, these automatic systems carry out a quantitative characterisation of it, calculating some morphological properties of the volume elements (technically: voxels) recognised as belonging to it. These properties are used to distinguish healthy tissue from that which is potentially diseased and from faecal residues.

One method for the three-dimensional analysis of organ lesions operating in a manner described above is for example described in American Patent Application US 2003/0223627 A1.

The solutions hitherto proposed for carrying out automatic identification of neoplastic lesions in the colon (polyps) have the great disadvantage that image interpretation can be complex and difficult when there are many other changes in the surface which may be due to polyps, but may also be due to artefacts (faeces, movement artefacts, etc.) generating an unacceptable percentage of errors (false positives and false negatives).

The object of the invention is therefore to provide a procedure for the automatic recognition of formations representing abnormalities in anatomical structures, and in particular preneoplastic lesions in the colon-rectum, which overcomes the limits of the known art.

This and other objects will be accomplished in accordance with the invention through a process whose main characteristics are defined in claim 1.

A further object of the invention is a processing system and a computer program for implementing the abovementioned process as claimed.

In sum, the invention is based on performing an operation of segmentation potential abnormal formations in an anatomical structure extracted from an image using an agglomeration technique in successive steps.

In the specific instance, the absorption intensity of the X-ray radiation used by the tomography technique to acquire and represent images of a patient's internal organs is made use of, but—in a similar way—the response of objects to other diagnostic radiations and, more generally, the response of objects present in the examination field due to interaction between the objects and electromagnetic excitation radiation incident upon them may be used, for example the colour of the objects (characterised by wavelength and intensity) is determined by the reflection of incident light radiation from them.

Advantageously, in the currently envisaged application to virtual colonoscopy, the stage of segmentation potential abnormal formations as successive agglomerations is able to reconstitute these formations with greater accuracy, thus making it possible to distinguish any polyps present more clearly from other geometrical changes in the internal surface of the colon which have different morphological characteristics and are of different origin.

Further features and advantages of the invention will be apparent from the detailed description which follows, provided purely by way of a non-limiting example with reference to the appended drawings, in which:

FIG. 1 is a flow diagram of the process according to the invention,

FIG. 2 is an illustration of five different types of surface characterised by corresponding shape index used for the recognition of abnormalities in anatomical structures, and FIG. 3 is a diagram of a processing system for recognising preneoplastic lesions in the colon-rectum according to the invention.

With reference to FIG. 1, the process to which the invention relates has its origin in the acquisition of Computerised Tomography image data in step 10, and then segmentation of the internal surface of the colon through a "region growing" algorithm is performed in step 20 based on the images acquired.

In subsequent step 30 pre-established geometrical parameters for the voxels recognised as belonging to the internal surface of the colon are calculated, and voxels which might belong to polyp regions are selected (step 40).

In step 50 a further process of growing the regions adjacent to the selected voxels is performed, and the regions grown around these voxels are subsequently agglomerated into analysis units (step 60).

Finally, the final classification of the analysis units into polyps or non-significant artefacts is performed (step 70).

The various steps shown in the flow diagram in FIG. 1, which have been briefly listed above, will now be described in detail.

Once the Computerised Tomography data have been obtained in the standard medical DICOM format, they are then first of all converted into a format which is suitable for processing in a program for the representation and display of images.

The subsequent stage in the process consists of automatic segmentation of the surface of the colon on the basis of the converted image data. This procedure is carried out on the basis of "region growing" algorithms which are known in the literature.

Once the voxels of the internal surface of the colon have been obtained through the segmentation stage, predetermined recognition properties, of which the main ones are geometrical characteristics, histograms of X-ray absorption intensities, statistical analysis of the texture using parameters such as, for example, contrast, correlation, energy, entropy and local homogeneity, are determined.

As far as geometrical characteristics are concerned, shape index (SI) and curvedness (CV) are preferably calculated. These parameters can be used to distinguish any polyps present within the colon from geometrical structures having a different curvature and shape.

Shape index and curvedness are expressed in relation to the local curvatures in orthogonal planes $k_{max}$ and $k_{min}$ of a structure, using the following equations:

$$SI(p) = \frac{1}{2} - \frac{1}{\pi}\arctan\frac{k_{max}(p) + k_{min}(p)}{k_{max}(p) - k_{min}(p)}$$

$$CV(p) = \frac{2}{\pi}\ln\sqrt{\frac{k_{max}(p)^2 + k_{min}(p)^2}{2}}$$

where p is the position of the voxel.

The shape index classifies the volumetric topological shape at position p of the voxel into five classes, generally known as: "cup", "rut", "saddle", "ridge", and "cap" (see FIG. 2). Higher values of the shape index correspond to a shape of the "cap" type and are particularly beneficial because many polyps exhibit this shape.

The curvature parameter characterises the magnitude of the effective curvature in the voxel and therefore provides a local estimate of by how much the surface within the voxel is curved.

Parameters SI and CV require calculation of the main curvatures $k_{max}$ and $k_{min}$, and these in turn require calculation of the first and second partial derivatives of the surface of the colon in the three reference directions x, y and z at right angles. In order to calculate the partial derivatives, it is preferred that iterative use be made of Deriche filters, according to a technique known from the literature. The equations for the partial derivatives are used to calculate the parameters SI and CV for all the voxels belonging to the surface. The voxels characterised by SI and CV values lying between a minimum and a maximum are selected as possibly belonging to regions suspected of containing polyps, and are subsequently used as starting points from which possible polyp regions are extracted.

Calculation of the shape index and curvedness parameters may be significantly costly in computational terms and memory resources. This is due to the fact that the calculation is performed on the entire surface or over large portions of surfaces containing hundreds of thousands of voxels. In order to reduce the amount of memory necessary for the calculations, it is convenient to subdivide the surface of the colon into "bounding boxes" or adjacent analysis volumes. Given a starting axial cross section, the dimensions of the analysis volumes are increased one step at a time in the longitudinal direction of the colon (z axis) in both directions. The increase in volumes is interrupted when a predetermined dimension in z is reached or when the surface of the colon comes to an end. The dimensions in the x and y directions vary according to the cross section of the lumen of the colon involved, while the z dimension is configured before these are calculated, and conveniently corresponds to a number of two-dimensional images of between 20 and 30 axial cross sections.

Advantageously, a second parameter dedicated to overdimensioning the analysis volumes, whose values may be altered in the x, y and z directions, is configured. In the z direction, this parameter generates an overlap between the analysis volumes and this is done in order to reduce distortion effects when calculating curvature at the edges of the analysis volumes.

Selection of the voxels by means of the morphological parameters of the shape index (SI) and curvedness (CV) is followed by growing, in terms of the number of voxels, the regions adjacent to the voxels selected, using Hysteresis techniques, from an agglomeration of increased selected voxels and from further growing of voxels within the tissue adjacent to the surface regions selected.

The Hysteresis method makes it possible to extract a set of voxels which are spatially connected to the previously selected initial regions. This method results in the extraction of a larger number of voxels of the internal surface of the colon which potentially correspond to a greater portion of a polyp. Additional voxels are selected reducing the lower threshold of the shape index (SI) parameter and increasing the range of interest of the curvedness parameter (CV).

Once the voxels have been characterised on the basis of their physical-geometrical properties, they are agglomerated into individual units of analysis representing regions which are classified as potentially containing or not containing polyps.

Voxels are grouped together into analysis units on the basis of the distribution of the spatial density of the voxels selected. The principle on which this agglomeration operation is based consists of recognising regions with a greater density of voxels selected, as a result of which the voxel density is greater within each agglomeration than outside it, and the density within the noise zone is always less than within the agglomerations. The operation requires definition of two parameters: the minimum number of points which the neighborhood of a voxel must possess, and the radius of the neighbourhood itself. Values for the parameters are selected, for example, empirically from a set of Computerised Tomography images.

This agglomeration operation is performed, for example, by using the known DBSCAN algorithm described in the article "Density Based Algorithm for Discovering Clusters in Large Spatial Database with Noise" by Ester, Kriegel, Sander and Xu published in Proceedings of 2nd International Conference on Knowledge Discovery and Data Mining (1996). Through this algorithm any number of agglomerations of any shape and independently of noise can be recognised from the selected voxels.

The analysis units so obtained may only contain a portion of the surface of the polyp. This is due to the fact that the curvedness parameters only detect the apex of the polyp which protrudes furthest into the lumen of the colon, and do not detect the base of the polyp which has curvature values which differ from those at its apex. Also a given polyp may be found by several analysis units, and these have to be merged into a single analysis unit. The procedure for extending the analysis unit to the entire polyp surface is as follows.

For every analysis unit a check is made to see whether there are any adjacent analysis units which might possibly be merged together with the analysis unit under investigation.

In this respect the centre of mass of the surface portion of the analysis unit under examination is calculated. From the calculated centre of the mass a check is made along the segmented surface of the colon to see if other analysis units are present within a predetermined maximum distance from the centre of mass, the value of which is determined empirically. The distance of each voxel explored corresponds to the length of the minimum path over the surface which links the voxel under examination to the central mass.

In order to recognise analysis units which are close to each other, each analysis unit is spherically extended by means of a "region growing" method, in which the analysis unit is extended in the colon tissue within a radius equal to the maximum distance between the centre of mass and the voxels already belonging to the analysis unit. Growth also includes the tissue voxels adjacent to the segmented surface.

In particular, while growing is in progress, the segment joining it to the centre of a mass is drawn for each voxel under investigation. If even only one of the voxels through which the segment passes lies in the lumen of the colon, the voxel under examination is not added to the analysis unit. If this is not the case, the voxel under examination is added to the analysis unit. This growing condition prevents the extension process from including portions of the colon which do not belong to polyps.

After the analysis units have been extended spherically, a check is made for each unit of analysis to see whether the units which are close to it overlap or are adjacent to it. Analysis units which are candidates for merging and comply with one of these conditions are merged with the analysis unit under examination.

The analysis macro-units so formed do not always include the base of the polyp. For this purpose a geometrical plane supporting the analysis macro-unit is determined on the basis of the voxels at the edge of its surface, which is parallel to the base of the polyp. The supporting plane is moved in a direction normal to it in successive steps and in a direction away from the apex of the macro-unit under examination (the apex is identified because of the fact that the voxels of the analysis macro-unit, including the apex voxels, lie on one side of the plane).

At each step in movement of the supporting plane the voxels of the segmented surface lying on the plane or adjacent to it within a predetermined distance, which is for example determined empirically, are determined. For each of these voxels the minimum distance with respect to the voxels of the supporting plane preceding that being examined is determined. If this distance is greater than a predetermined threshold (determined empirically, for example), the voxel is not added to the analysis macro-unit, but if it is not the voxel is added.

If in a particular step at least one voxel is at a distance greater than that threshold, the percentage of voxels belonging to the supporting plane under examination having a minimum distance which is greater than the threshold is calculated. If this percentage exceeds a threshold percentage, extension of the analysis unit along the surface is terminated.

If this percentage is instead less than the threshold percentage, another supporting plane is calculated from the voxels at a distance from the voxel of the current supporting plane which is less than the threshold distance, and from the voxels of the previously calculated supporting plane adjacent to the voxels of the current supporting plane which are at a distance greater than the threshold distance.

The process continues iteratively until the above condition is achieved.

The aim of extending the analysis units using the steps described is to extend the portion of the surface area of the analysis units.

Although a portion of adjacent tissue has been selected in the course of the extension process, this portion of tissue is not regarded as forming part of the analysis macro-unit, because it may also include surrounding tissue which does not belong to the polyp. Effective extension of the analysis macro-unit into the tissue, which extracts the polyp tissue with greater accuracy, is achieved by combining together the identified surface voxels using straight segments. The voxels through which the segments which belong to tissue adjacent to the surface pass are added to the analysis units and macro-units as new voxels. Advantageously, this process makes it possible to extend even the smallest analysis units sufficiently to have a significant number of voxels that make them up.

The agglomerations achieved represent possible polyps for subsequent examination of the colon-rectum.

The number of voxels belonging to the analysis units selected is normally very much less than the overall number of the internal surface of the colon-rectum.

However, even analysis units which do not belong to polyps may be selected by means of this process. These selections help to increase the number of false positives, that is possible polyps selected as being suspect but which do not actually belong to polyps.

In order to reduce the number of these, it is convenient to calculate further parameters describing other properties of the analysis units which might improve discrimination of the recognition algorithm.

In addition to the geometrical properties of the voxels, it is also preferable to study other properties, for example properties associated with the intensity of X-ray absorption of the individual voxels. In this respect intensity histograms are studied for all voxels of the surface area of the colon and of its neighborhood. The purpose of this analysis is to establish whether the voxels in regions which belong to polyps have a characteristic histogram which is different from those of the voxels in other regions of the colon. In fact in many cases polyps show a difference in X-ray absorption in comparison with healthy tissue or faecal residues.

Neural networks, for example a neural network of the "feed-forward" type, which is in itself known, may be used to study the characteristics of the histograms.

Another property studied is the texture, a property associated with image intensity. This can easily be perceived by the human eye and is believed to be a rich source of information on the nature and shape of three-dimensional objects. Texture is a complex visual shape comprising macrostructural or microstructural subshapes which have characteristic brightness or colour or size. The local properties of the subshapes make it possible to distinguish the luminosity, uniformity, density, granularity, regularity, noisiness, and directionality characteristics of a texture as a whole.

There are various approaches to textural analysis: structural, statistical, by models, by transforms. Among these approaches, second order statistical approaches have shown to give better results than other analytical approaches. For this reason, and because abdomen images are characteristically devoid of macrostructural subforms, it is advantageous to use a statistical approach, for example an approach based on co-occurrence matrices, which are known in the literature.

The calculation is heavy on computer power and for this reason it is conveniently only carried out in the thirteen directions defining the first, second and third neighbours of a voxel and their corresponding distances.

In addition to the intensity histogram and texture, other characteristic parameters can be used to reduce false positives. One of these is the calculation of Zernike moments.

This method makes use of the fact that polyps can be recognised not only by analysing the information content of the data from Computerised Tomography images relating to absorption and 3D spatial distribution, but also from their spheroidal morphology. In this respect the Zernike coefficients known from the literature are calculated. These geometrical descriptors have been used to recognise images of objects in large image databases. These parameters make it possible to recognise an object of given shape independently from its size and orientation. These special symmetry properties render Zernike coefficients particularly useful for studying the morphology of polyps, the shape of which is generally spheroidal, but which may vary in size from a few millimeters to over a centimeter, and which may have any orientation in space.

All the parameters characterising voxels represent a large amount of information which has to be analysed in order to classify voxels, distinguishing between voxels in regions suspected as being part of polyps and voxels in regions of healthy tissue.

Classification of voxels is a multidimensional recognition problem which can be solved using neural networks and/or other statistical classifiers.

The process according to the invention is carried out by a system of the type illustrated in FIG. 3, which comprises a computerised workstation 100, of a known type, having a processor subsystem 110, a display device 120, a keyboard 130, a mouse 140 and a device for connection to a local network (network bus) 150. Alternatively, the processing system may be of the distributed type (not illustrated) having a processor subsystem and peripheral local or remote input/output devices. Workstation 100 or the distributed system are designed to process groups or modules of processing and calculation programs stored on a disk 160 or accessed from the network, capable of displaying the process described, and of displaying the results on display 120. These arrangements are considered to be well known to those skilled in the art and will not be further described here because they are not in themselves relevant for the purposes of implementing and understanding this invention.

Naturally, the principle of the invention remaining the same, the embodiments and details of construction may be varied widely from what has been described and illustrated purely by way of a non-limiting example, without thereby going beyond the scope of protection of the present invention as defined in the appended claims.

The invention claimed is:

1. Process for the automatic recognition of abnormalities in anatomical structures, comprising the operations of:
   acquiring (10) a plurality of two-dimensional images of at least one portion of a patient's body forming a three-dimensional representation of at least one anatomical structure under observation;
   segmenting (20) a region of interest in said three-dimensional representation which potentially contains anomalies;
   selecting (30, 40) volume image elements (voxels) from the segmented region which are likely to belong to abnormalities in the anatomical structure represented, on the basis of predetermined morphological parameters;
   agglomerating (60) regions of voxels into analysis units according to a predetermined proximity criterion; and
   classifying (70) of said voxels as elements suspected of belong to abnormalities or as elements which do not belong to abnormalities,
   wherein the stage of agglomerating (60) the regions of voxels into analysis units is performed by grouping together the voxels on the basis of the spatial density distribution of the voxels selected,
   wherein the process includes the merging of the analysis units lying within a predetermined distance from the centre of mass of the surface portion of an analysis unit under investigation, and
   wherein the distance of each voxel explored of an analysis unit under investigation overlapping or adjacent the reference analysis unit under investigation is calculated as the length of the minimum path over the segmented surface of said anatomical structure, which links said voxel to the centre of mass of the reference analysis unit under investigation.

2. Process according to claim 1, in which the region of interest includes the internal surface of the tissues of the colon, and the said abnormalities in anatomical structures include preneoplastic lesions of the colon.

3. Process according to claim 2, in which the two-dimensional images are transverse cross-sectional images of a patient's body obtained using radiodiagnostic techniques.

4. Process according to claim 3, comprising the acquisition of computerised tomography image data, through which segmentation of the region of interest is based on comparing X-ray radiation absorption intensity values relating to elements of the image.

5. Process according to claim 4, in which said morphological parameters include shape index (SI) and curvedness (CV).

6. Process according to claim 5, in which the shape index (SI) and the curvedness (CV) are calculated on the basis of the main curvatures of the surface of the tissues of the segmented colon, using the calculation of first and second partial derivatives of the image through the iterative use of Deriche filters.

7. Process according to claim 6, in which the voxels characterised by shape index (SI) and curvedness (CV) lying between corresponding predetermined ranges of values are selected as possibly belonging to abnormalities.

8. Process according to claim 7, in which the morphological parameters are calculated by subdividing the segmented region into adjacent analysis volumes.

9. Process according to claim 4, in which the voxels in the segmented region which are likely to belong to abnormalities in the anatomical structure are selected on the basis of the corresponding X-ray radiation absorption intensity.

10. Process according to claim 4, in which the voxels of the segmented region which are likely to belong to abnormalities in the anatomical structure are selected on the basis of texture properties.

11. Process according to claim 1, comprising the stage of growing (50) regions around selected voxels after selecting (40) voxels in the segmented region which are likely to belong to abnormalities in the anatomical structure represented.

12. Process according to claim 11, in which said stage of growing (50) regions around the selected voxels is performed using Hysteresis techniques, selecting from the surroundings voxels whose shape index (SI) and curvedness (CV) lie within enlarged ranges of values.

13. Process according to claim 1, in which the analysis units are extended to adjacent voxels of tissue through spherical growing governed by a radius of growth equal to the maximum distance between the centre of mass and the surface voxels belonging to the analysis unit under investigation.

14. Process according to claim 13, in which a voxel of tissue is not added to the analysis unit if at least one of the voxels crossed by the segment joining the said tissue voxel with the centre of mass belongs to the lumen of the colon.

15. Process according to claim 13, in which an analysis macro-unit obtained by merging analysis units is extended to include surface voxels which lie on planes parallel to a supporting plane calculated on the basis of the surface voxels at the edge of the analysis macro-unit.

16. Process according to claim 1, in which the said analysis units are extended from the surface of the colon to the adjacent tissue by adding tissue voxels selected from the tissue voxels crossed by linear segments joining the surface voxels identified during the said agglomeration stage.

17. Processing system (100-160) for the automatic recognition of abnormalities in anatomical structures designed to implement a process according to claim 1.

18. A non-transitory computer readable medium comprising a processing program comprising one or more code modules for implementing a process for the automatic recognition of abnormalities in anatomical structures according to claim 1.

* * * * *